(12) United States Patent
Cliff

(10) Patent No.: US 11,365,803 B2
(45) Date of Patent: Jun. 21, 2022

(54) HYDRAULIC DEVICE WITH DECOUPLED FILLER INSERT FOR HYDRAULIC CIRCUIT VOLUME REDUCTION

(71) Applicant: Deere & Company, Moline, IL (US)

(72) Inventor: Michael J. Cliff, Coffeyville, KS (US)

(73) Assignee: DEERE & COMPANY, Moline, IL (US)

( * ) Notice: Subject to any disclaimer, the term of this patent is extended or adjusted under 35 U.S.C. 154(b) by 72 days.

(21) Appl. No.: 16/934,156

(22) Filed: Jul. 21, 2020

(65) Prior Publication Data

US 2022/0025969 A1    Jan. 27, 2022

(51) Int. Cl.
*F16H 61/30* (2006.01)
*F16H 3/02* (2006.01)

(52) U.S. Cl.
CPC .............. *F16H 61/30* (2013.01); *F16H 3/02* (2013.01)

(58) Field of Classification Search
CPC ................................... F16H 61/30; F16H 3/02
See application file for complete search history.

(56) References Cited

U.S. PATENT DOCUMENTS

| 3,213,881 A * | 10/1965 | Findlay .................. F15B 13/06 137/596 |
| 8,128,180 B2 | 3/2012 | Weh et al. |
| 9,688,256 B2 | 6/2017 | Weh |
| 2021/0199138 A1 * | 7/2021 | Okamoto .................. F15B 7/06 |

* cited by examiner

*Primary Examiner* — Nictor L MacArthur
(74) *Attorney, Agent, or Firm* — Klintworth & Rozenblat IP LLP

(57) ABSTRACT

A hydraulic device for a work vehicle includes a device body, a plug, and a filler insert. The device body includes a wall structure between surfaces defining internal passages including an access passage having a first diameter extending from an access opening in the device body to a hydraulic fluid passage extending through the wall structure from an entry opening in a first surface to an exit opening in a second surface to deliver hydraulic fluid through the wall structure. A plug is mounted to the device body to close the access opening. A filler insert is proximate the plug and has a shank having a circular cross-section of a second diameter that is less than the first diameter so as to be decoupled from the inner wall surface of the access passage. An annular space around the shank in the access passage allows the hydraulic fluid to encircle at least a part of the shank of the filler insert.

20 Claims, 4 Drawing Sheets

HYDRAULIC DEVICE WITH DECOUPLED FILLER INSERT FOR HYDRAULIC CIRCUIT VOLUME REDUCTION

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to hydraulic components of a work vehicle and/or work vehicle implements, and in particular to improved hydraulic response of the hydraulic component.

BACKGROUND OF THE DISCLOSURE

Work vehicles, such as those used in the construction, forestry, agriculture and mining industries, typically include hydraulic components to power various systems onboard or coupled to the work vehicle, including various drives and work implements. In certain applications, the hydraulic components may be called upon to provide highly rapid and accurate power output. Hydraulic circuits of conventional hydraulic components may have internal passages manufactured by machining operations, such as drilling and boring, that leave legacy ports and passages that are not needed to contain and route the pressurized hydraulic fluid within the hydraulic circuit. The presence of such superfluous passages may impact the performance of the hydraulic circuit, the hydraulic device and the work vehicle.

SUMMARY OF THE DISCLOSURE

A hydraulic device for a work vehicle includes one or more features for reducing the internal volume of the pressurized hydraulic fluid containing circuit of the device.

In one aspect, this disclosure provides a hydraulic device that includes a device body, a plug, and a filler insert. The device body has a first surface, a second surface and wall structure between the first surface and the second surface. The wall structure defines a plurality of internal passages including an access passage and a hydraulic fluid passage, the access passage at least in part having a cylindrical inner wall surface of a first diameter. The access passage extends through the wall structure from an access opening in the device body to the hydraulic fluid passage, the hydraulic fluid passage extends through the wall structure from an entry opening in the first surface of the device body to an exit opening in the second surface of the device body to deliver hydraulic fluid through the wall structure from the entry opening to the exit opening. A plug is fixedly or removably mounted to the device body to close the access opening. A filler insert is disposed proximate or coupled to the plug within the access passage, the filler insert having a cylindrical shank at least in part having a circular cross-section of a second diameter that is less than the first diameter of the inner wall surface of the access passage so as to be decoupled from the inner wall surface of the access passage. An annular space between the shank of the filler insert and the inner wall surface of the access passage allows the hydraulic fluid to encircle at least a part of the shank of the filler insert.

In other aspects, this disclosure provides a hydraulic transmission for a work vehicle and a work vehicle having a hydraulic transmission are provided. The hydraulic transmission includes a plurality of gears providing multiple gear ratios, a clutch for shifting the plurality of gears among the multiple gear ratios, a gearbox body, one or more control valves, a plug, and a filler insert. The clutch is powered at least in part by hydraulic pressure. The gearbox body is mounting the plurality of gears and the clutch within an internal cavity, the gearbox body having a first surface, a second surface and wall structure between the first surface and the second surface, the wall structure defining a plurality of internal passages including an access passage and a hydraulic fluid passage, the access passage at least in part having a cylindrical inner wall surface of a first diameter, the access passage extending through the wall structure from an access opening in the gearbox body to the hydraulic fluid passage, the hydraulic fluid passage extending through the wall structure from an entry opening in the first surface of the gearbox body to an exit opening in the second surface of the gearbox body to deliver hydraulic fluid through the wall structure from the entry opening to the exit opening. The one or more control valves are mounted to the exit opening of the gearbox body and in fluid communication with the hydraulic fluid passage, the one or more control valves configured to activate the clutch. The plug is fixedly or removably mounted to the gearbox body to close the access opening. The filler insert is disposed proximate or coupled to the plug within the access passage. The filler insert has a cylindrical shank at least in part having a circular cross-section of a second diameter that is less than the first diameter of the inner wall surface of the access passage so as to be decoupled from the inner wall surface of the access passage. An annular space between the shank of the filler insert and the inner wall surface of the access passage allows the hydraulic fluid to encircle at least a part of the shank of the filler insert The details of one or more embodiments are set forth in the accompanying drawings and the description below. Other features and advantages will become apparent from the description, the drawings, and the claims.

BRIEF DESCRIPTION OF THE DRAWINGS

At least one example of the present disclosure will hereinafter be described in conjunction with the following figures.

Like reference symbols in the various drawings indicate like elements. For simplicity and clarity of illustration, descriptions and details of well-known features and techniques may be omitted to avoid unnecessarily obscuring the example and non-limiting embodiments of the invention described in the subsequent Detailed Description. It should further be understood that features or elements appearing in the accompanying figures are not necessarily drawn to scale unless otherwise stated.

DETAILED DESCRIPTION

Figure 1:
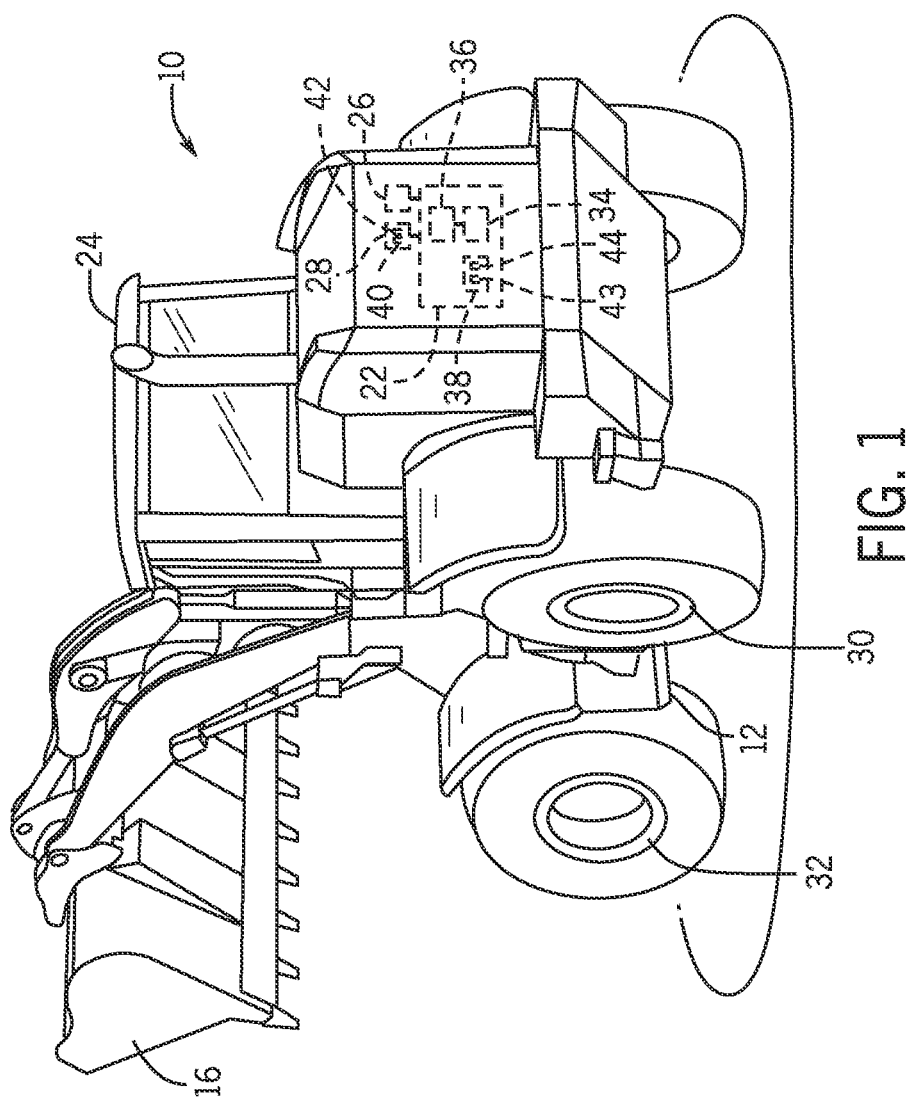
FIG. 1 is a perspective view of an example work vehicle in the form of a wheel loader that includes a transmission having a hydraulic circuit with a decoupled filler insert in accordance with the present disclosure.

Embodiments of the present disclosure are shown in the accompanying figures of the drawings described briefly above. Various modifications to the example embodiments may be contemplated by one of skill in the art without departing from the scope of the present invention, as set-forth the appended claims.

Overview

Work vehicles typically include hydraulic devices that scale up the power delivered by the prime mover to various components of the work vehicle, such as the wheels and implements. In certain applications, the hydraulic devices may need to provide highly rapid and accurate power output. Hydraulic circuits of conventional hydraulic components may have internal passages manufactured by machining operations, such as drilling and boring, that leave legacy ports and passages unneeded for the hydraulic circuit. These superfluous passages unnecessarily expand the internal volume of the hydraulic circuit and increase hydraulic flow requirements. This may introduce lag or inconsistencies in the control of the pressurized hydraulic fluid within the hydraulic circuit from the increased flow as well as by creating areas within the hydraulic circuit for air to arise. Air, being a gas and thereby compressible, can vary in volume due to fluctuations in pressure within the hydraulic circuit and thereby alter the characteristic responsiveness of the hydraulic circuit. Inconsistent or irresponsive operation of the hydraulic circuit can diminish its performance below that needed for certain applications.

A hydraulic device of a work vehicle may have a hydraulic circuit with one or more internal hydraulic fluid passages for conveying pressurized hydraulic fluid to a hydraulic component and one or more access passages formed to provide internal access to the device body access needed to manufacture the hydraulic fluid passages. An "access passage" as used herein is an external or internal passage that does not serve to convey hydraulic fluid to a hydraulic component, but rather to allow internal access within the device body to form the fluid-carrying passages of the hydraulic circuit. An access passage thus is in fluid communication with the hydraulic fluid passages and contains hydraulic fluid, however, it is not part of the primary flow path of the hydraulic circuit leading to the hydraulic component being powered or returning to tank, and in this sense may be considered a non-operative passage of the hydraulic circuit. As such, the access passage could, and likely would, be omitted if not used when manufacturing the hydraulic fluid passages.

This disclosure pertains to hydraulic devices for work vehicles in which one or more filler inserts (which may also be considered "volumetric" inserts) are installed within an access pass primarily to occupy an internal volume of the access passage. Occupying a volume of the access passage reduces the volume of hydraulic fluid within the access passage and thereby within the hydraulic circuit. This reduces the hydraulic fluid volume and throughput flow requirements of the hydraulic circuit and may reduce the presence of air within the hydraulic circuit by reducing or eliminating the "dead space" within the hydraulic circuit where air may tend to accumulate, especially during idle periods when the hydraulic circuit is not pressurized (e.g., at a cold start of the work vehicle engine). Reducing air within the hydraulic circuit improves the consistency and responsiveness of the hydraulic circuit by reducing or avoiding the attendant pressure and flow fluctuations that may arise from compression of the air.

The filler insert may be installed within the access passage in a loose fit, as distinguished, for example, from a press fit or a slip or transition fit, in which some or all of the filler insert is spaced apart from an inner wall surface of the access passage by an annular space, as defined between an inner diameter of the access passage and an outer diameter of the filler insert. A loose fit allows a volume of hydraulic fluid to be present in such annular space between the filler insert and the inner wall surface. During use, the filler insert, although physically decoupled, wholly or in part, from the body of the hydraulic device, remains stationary, being held by fluid pressure, and does not contact (e.g., rattle against) the inner wall surface of the access passage. The filler insert does not effect any dampening within the hydraulic circuit, and the hydraulic circuit in general may be undampened. In some cases, the filler insert may occupy the majority of the internal volume of the access passage, and in certain embodiments and applications, the filler insert may occupy about 85% to about 99% of the internal volume of the access passage, leaving only a thin layer of fluid surrounding some or all of the filler insert. The filler insert may occupy the aforementioned volumetric values in terms of the overall volume of the access passage, the volume based on the cross-sectional area of the access passage, or both.

The filler insert may include or companion with a plug that seals an external access opening of the access passage in which the filler insert is disposed. The plug reduces or prevents egress of hydraulic fluid from and ingress of contaminants into the hydraulic circuit. The plug positively engages the access opening of the access passage, for example by threading or a press fit, and may include or couple with a gasket or seal the access opening. In certain examples, the filler insert is a separate part entirely physically disconnected from the body of the hydraulic device and a plug connected thereto. In such cases, the entire filler insert is spaced from the inner wall surface of the access passage and is completely surrounded by the hydraulic fluid, including along its circumference and ends. In other examples, the filler insert and the plug are a unitary or common part (formed from the same material by the same process at the same time) of which the filler insert forms a free-ended shank that is has its circumferential surface and free end physically disconnected from the device body. In either case, the filler insert is considered to be "decoupled" from the inner wall surface of the access passage. Whether the filler insert is physically connected to the plug or not, the plug may serve to contain the filler insert and maintain its position within the access passage either by direct abutting contact with the filler insert or the hydraulic fluid enveloping the filler insert.

One example application of a hydraulic device for a work vehicle in which the disclosure may be implemented favorably is a hydraulically controlled transmission. A work vehicle transmission may have one or more clutches to shift gears that are applied or released under hydraulic pressure that is metered through one or more control valves. Smooth travel of the work vehicle under extreme loads (e.g., a gross vehicle weight of about 30-50 tons or more) may demand highly accurate and rapid operation of the clutches. With such large loads, unintended slip or delay in clutch operation may result in rough shift changes that interrupt smooth motion of the work vehicle that may be uncomfortable for the operator, disturb payload and stress the transmission. The control valves for the clutches thus must precisely apply the requisite pressure of hydraulic fluid. Work vehicle transmission having such desirable characteristics are provided herein and realized, at least in part, through the incorporation of a hydraulic circuit of internal passages having one or more volumetric inserts, including a filler insert disposed within an access passage. As noted above, the filler insert serves to reduce the volume of hydraulic fluid in the hydraulic circuit and to reduce the deleterious effects of air within the hydraulic circuit that hinder the precision of the control valves. Due to the filler insert, the hydraulic circuit is able to more consistently and accurately operate the control valves and clutches, and thereby the transmission is able to more smoothly shift the gears during work vehicle operation. The disclosed arrangements of the volumetric insert may improve transmission performance including response time and shift feel, especially from a cold start when air or aerated oil may have otherwise settled in the access passage. Moreover, the disclosed volumetric insert may extend the life of clutch (or other) hydraulic components.

Example Embodiments of Hydraulic Device with Decoupled Filler Insert for Hydraulic Circuit Volume Reduction Referring to FIG. 1, in some embodiments, the disclosed work vehicle 10 may be a wheel loader, although the hydraulic circuit and volumetric insert described herein may be applicable to a variety of work vehicle platforms, such as other construction vehicles (e.g., motor graders), agricultural vehicles including tractors, and forestry vehicles (e.g., forwarders). As shown, the work vehicle 10 may be considered to include a chassis constituted by a chassis 12 supporting a work implement 16. The work implement 16 is selectively positioned by various combinations of structural elements (e.g., arms, crossbars, pivot joints, etc.) and controllably moved utilizing any number of actuators, such as hydraulic cylinders. The work vehicle 10 may further be considered to include a power train 22, an operator cabin 24, a control system 26, and a hydraulic system 28. The work vehicle 10 may be supported off the ground by ground-engaging wheels or tracks. In the illustrated example, the work vehicle 10 includes a rear axle (not shown) mounting driven rear wheels 30 (one or more at each left/right side of the work vehicle 10) and a front axle (not shown) mounting steerable front wheels 32 (one at each left/right lateral side of the work vehicle 10).

The control system 26 may control various aspects of the work vehicle 20, particularly characteristics of the power train 22. The control system 26 may include a work vehicle electronic controller unit (ECU) or a dedicated controller. In some embodiments, the control system 26 may be configured to receive input commands and to interface with an operator via a human-machine interface or operator interface (not shown) and from various sensors, units, and systems onboard or remote from the work vehicle 20; and in response, the control system 26 generates one or more types of commands for implementation by the power train 22 and/or various systems of work vehicle 20 (e.g., the hydraulic system 28).

Generally, the power train 22 includes a source of propulsion, such as an engine 34, which supplies power to the work vehicle 10, as either direct mechanical power or after being converted to electric power (e.g., via batteries) or hydraulic power. In one example, the engine 34 is an internal combustion engine, such as a diesel engine, that is controlled by an engine control module (not shown) of the control system 26. It should be noted that the use of an internal combustion engine is merely an example, as the source of propulsion may be a fuel cell, an electric motor, a hybrid-gas electric motor, or other power-producing devices. The engine 34 selectively drives the wheels or tracks of the work vehicle 10, for example the rear wheels 30 or both the rear and front wheels 30, 32. Additionally, the power train 22 has wheel steering components 36, including various devices (e.g., power steering pumps and lines, steering mechanisms, and the like) that couple manual (e.g., operator steering controls or wheel) and/or automated (via the control system 26) steering input to one or more of the sets of wheels, such as the front wheels 32.

The power train 22 of the work vehicle 10 further includes a hydraulic transmission 38. For example, the transmission 38 may be mounted on the rear frame 12 of the work vehicle 10 at a location behind the operator cabin 24. During operation, the transmission 38 transmits power (e.g., via rotatory motion from the engine 34 and/or electric motors) to driven components (e.g., the work implement 16, the rear wheels 30, the wheel steering components 36, and/or other components) of the work vehicle 10 with gearing that provides a desired mechanical reduction between the engine output and the driven components. To provide the desired gearing to the driven component(s), the transmission 38 of the work vehicle 10 contains a hydraulic circuit 40, which is a portion of the hydraulic system 28 and functions to distribute pressurized hydraulic fluid through the transmission 38 to one or more clutches, torque converters, and the like by way of a variety of passages, valves, pumps, filters, and the like. The one or more clutches enact gear shifting among multiple forward gear ratios and a reverse gearing for transmission to the rear wheels 30. In accordance with embodiments of the present disclosure, the hydraulic circuit 40 includes one or more electro-hydraulic control valves, such as control valve 42, which may be, for example, an electronically controlled modulation valve (ECMV), that controls one or more clutches, such as clutch 44, of the transmission 38, as discussed more fully below in connection with FIGS. 2-5. Generally, the control valve 42 senses oil pressure in the hydraulic circuit 40 and meters a flow of hydraulic fluid to provide a desired pressure downstream to a hydraulic component with feedback control via the control system 26. Various other types of control valves (e.g., proportional valves, modulated valves, proportional modulated valves, and the like) and/or other types of hydraulic components are applicable to the hydraulic circuit of the present disclosure.

The control system 26 generates commands to control the flow of pressurized hydraulic fluid through the hydraulic circuit 40 by sending command signals to the various valves and pumps within the transmission 38. In the disclosed example, the control system 26 sends commands to the example electro-hydraulic control valve 42 to engage or disengage the clutch 44 and to maintain a target pressure for actuating the clutch 44. The hydraulic control valve 42 is configured to provide a desired pressure of hydraulic fluid to the clutch 44, such as in a range of about 100-400 pounds per square inch (PSI). In one example, the desired pressure may be about 300 PSI. The hydraulic control valve 42 monitors pressure in the hydraulic circuit and/or at the clutch 44 and may provide up to about four hundred adjustments per second to maintain optimal clutch performance.

Generally, the control system 26 may be configured as computing devices with associated processor devices and memory architectures, as hydraulic, electrical or electro-hydraulic controllers, or otherwise. As such, the control system 26 may be configured to execute various computational and control functionality with respect to the power train 22 (and other machinery). The control system 26 may be in electronic, hydraulic, or other communication with various other systems or devices of the work vehicle 20. For example, the control system 26 may be in electronic or hydraulic communication with various actuators, sensors, and other devices within (or outside of) the work vehicle 20, including various devices associated with the power train 22. Generally, the control system 26 generates the command signals based on operator input, operational conditions, and routines and/or schedules stored in the memory. In some examples, the control system 26 may additionally or alternatively operate autonomously without input from a human operator. The control system 26 may communicate with other systems or devices (including other controllers) in various known ways, including via a CAN bus, via wireless or hydraulic communication means, or otherwise.

Figure 2:
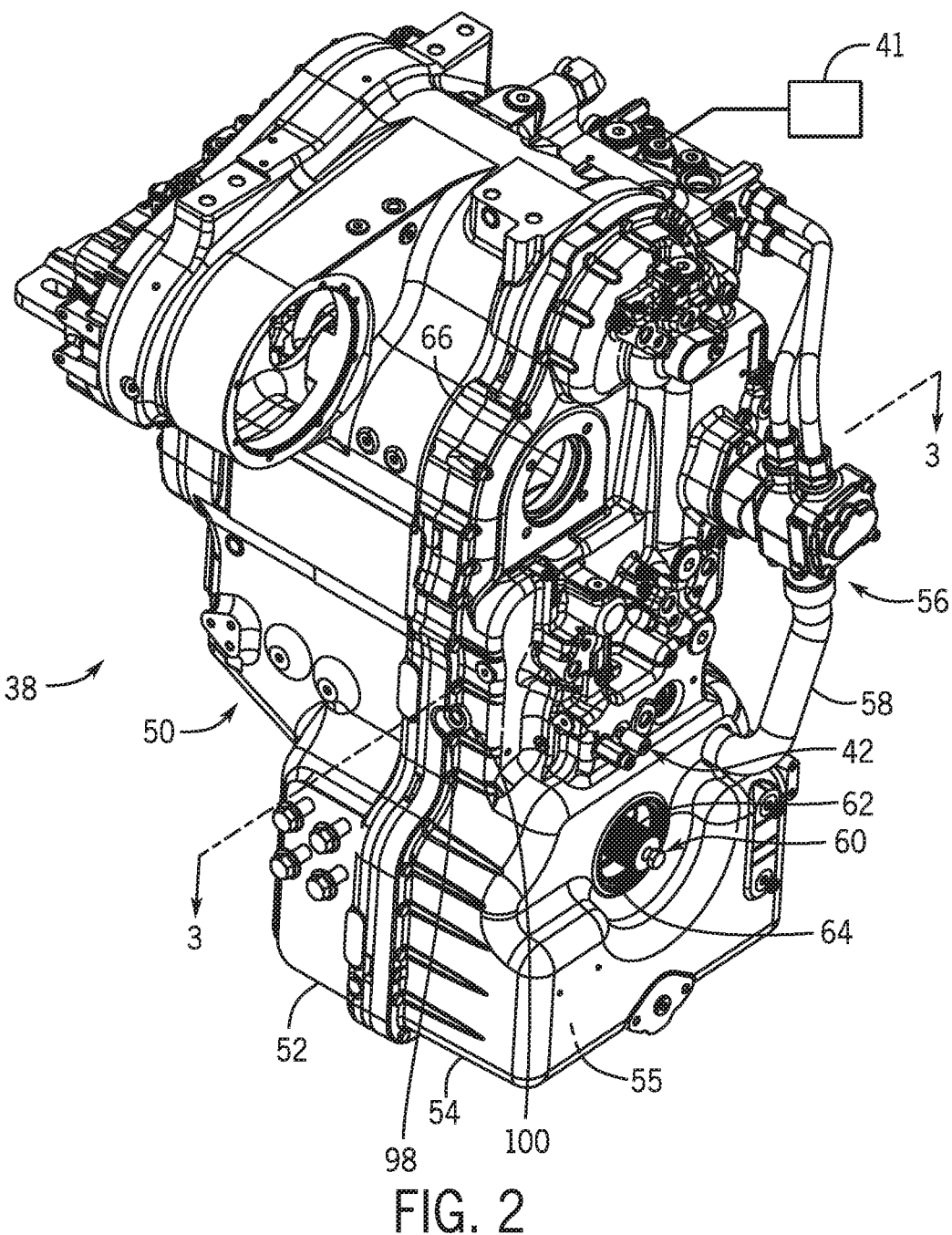
FIG. 2 is an isometric view of the example transmission for the example wheel loader of FIG. 1.

Referring also to FIG. 2, the transmission 38 includes a device body illustrated as a gearbox body 50 defined by a first housing body 52 (illustrated as a forward housing body) and a second housing body 54 (illustrated as a rear housing body). The terms "forward" and "rear," as appearing herein, are defined with respect to the fore-aft travel of the work vehicle 10 in which the gearbox body 50 is incorporated. Generally, the gearbox body 50 contains various mechanical components including gears, shafts, bearings, and other such components arranged to provide gear reduction from an input to an output. During assembly, the various mechanical components contained within the gearbox body 50 may be initially installed within the first housing body 52. The second housing body 54 may then be brought together with the first housing body 52. Finally, the first and second housing bodies 52, 54 may be joined together utilizing, for example, bolts or other fasteners. When assembled, the first and second housing bodies 52, 54 form an internal cavity 55 that defines a sump to retain a reservoir of oil for lubricating and/or cooling the various mechanical components of the transmission 38 and supplies oil for at least a portion of the hydraulic system 28. As shown, a hydraulic pump assembly 56 draws oil from the reservoir of the internal cavity 55 via a feed line 58 to recirculate a supply of pressurized hydraulic fluid to the transmission 38.

The transmission 38 includes an output shaft assembly 60 including one or more output shafts 62 mounted in corresponding output gear mounts 64. The output shaft 62 also extends through the first housing body 52. Various additional shafts and gears (43 in FIG. 1) are rotationally supported in gear mounts, including an input gear input gear mount 66 for mounting an input shaft that receives rotational input from the engine 34. The various additional gears are mechanically linked between an input gear (not shown) in the input gear mount 66 and the output shaft assembly 60. The gears of the transmission 38 may be arranged into a number of stages with different effective gear ratios. In further embodiments, various other gear train configurations are possible. The output shaft assembly 60 provides selective mechanical connection (e.g., via splined shafts) to a corresponding rotatable component of the work vehicle 10, for example a portion of the power train 22 operatively connected to the rear wheels 30 or a rotatable component operatively connected to the work implement 16.

Figure 3:
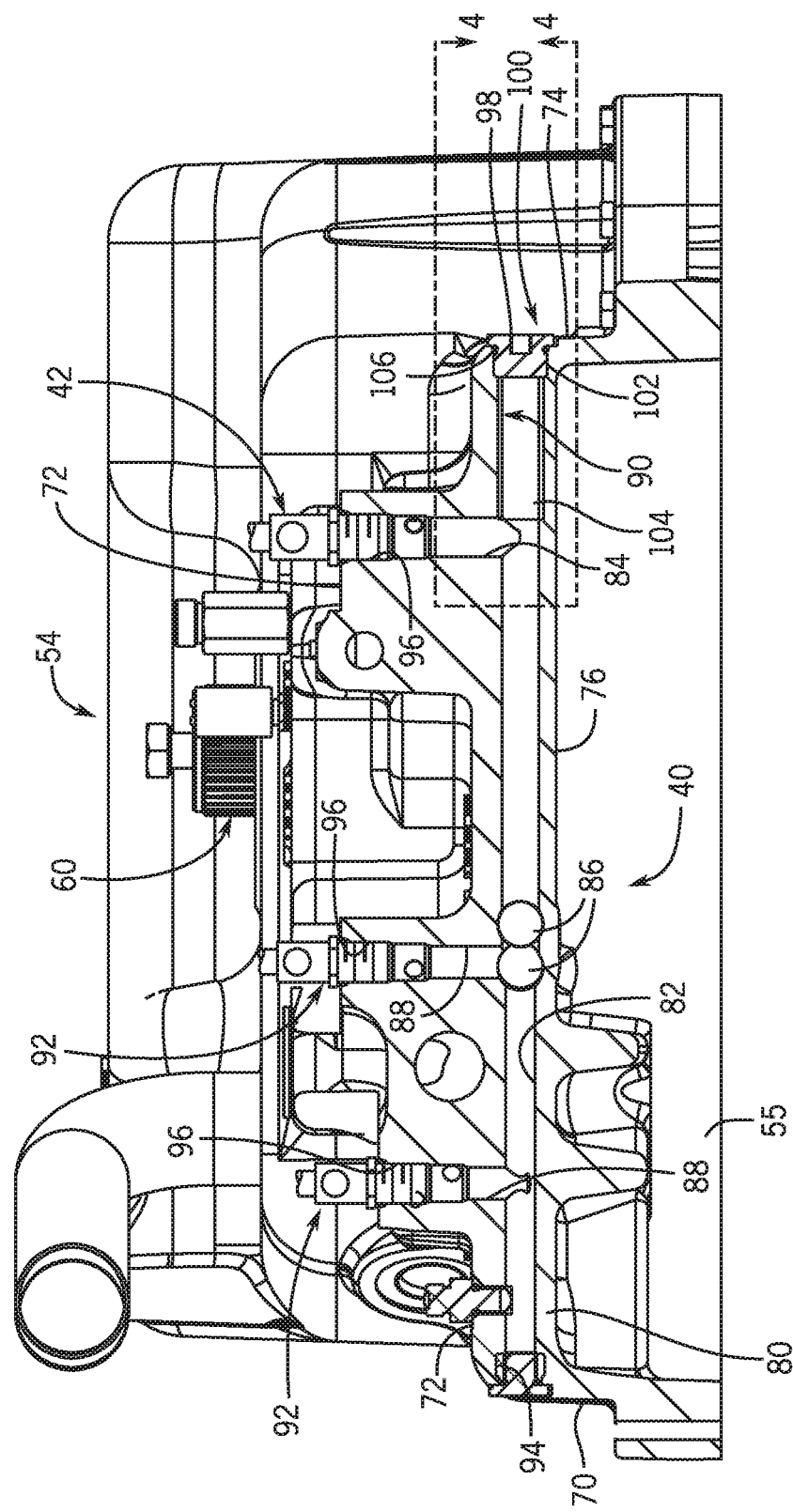
FIG. 3 is a partial cross-sectional view thereof taken along line 3-3 of FIG. 2.

Referring also to FIG. 3, a portion of the hydraulic circuit 40 is formed in a device body, illustrated here as the second housing body 54. The second housing body 54 defines several surfaces, including a first surface 70 on a lateral side of the transmission 38, a second surface 72 facing the rear of the transmission 38, a third surface 74 opposite the first surface, and a fourth surface 76 opposite the second surface and facing the interior of the transmission 38. A wall structure 80 extends between the first and second surfaces 70, 72. The wall structure 80 defines a plurality of internal passages 82, 84, 86, 88, 90 that are in fluid communication to define a portion of the hydraulic circuit 40. In use, the plurality of internal passages 82, 84, 86, 88, 90 contain pressurized hydraulic fluid (e.g., oil).

The second housing body 54 also mounts hydraulic components that are operatively coupled with the hydraulic circuit 40. One or more hydraulic fluid passages 82 connect a hydraulic supply from the hydraulic system 28 of the work vehicle 10 (e.g., hydraulic supply tank 41 from the hydraulic pump assembly 56 shown in FIG. 2) to the control valve 42 or another hydraulic component. As shown, the hydraulic fluid passages 82 include a component passage 84 mounting the control valve 42. The hydraulic fluid passage 82 includes one or more cross passages 86 extending to other regions of the second housing body 54 and additional component passages 88 similarly mounting additional control valves 92. The hydraulic fluid passages 82, and the component passage 84, the cross passages 86, and the additional component passages 88, all convey pressurized hydraulic fluid from the hydraulic system 28 at an entry opening 94 to a hydraulic component at an exit opening 96, such as the control valve 42 or additional control valves 92. An access passage 90 of the plurality of internal passages 82, 84, 86, 88, 90 extends from the hydraulic fluid passage 82 to an access opening 98 and thus the exterior of the second housing body 54. The access passage 90, while in fluid communication with the other passages 82, 84, 86, 88, 90, does not serve as part of the hydraulic flow path between the hydraulic supply tank 41 and any hydraulic component of the transmission 38 or the work vehicle 10.

Figure 4:
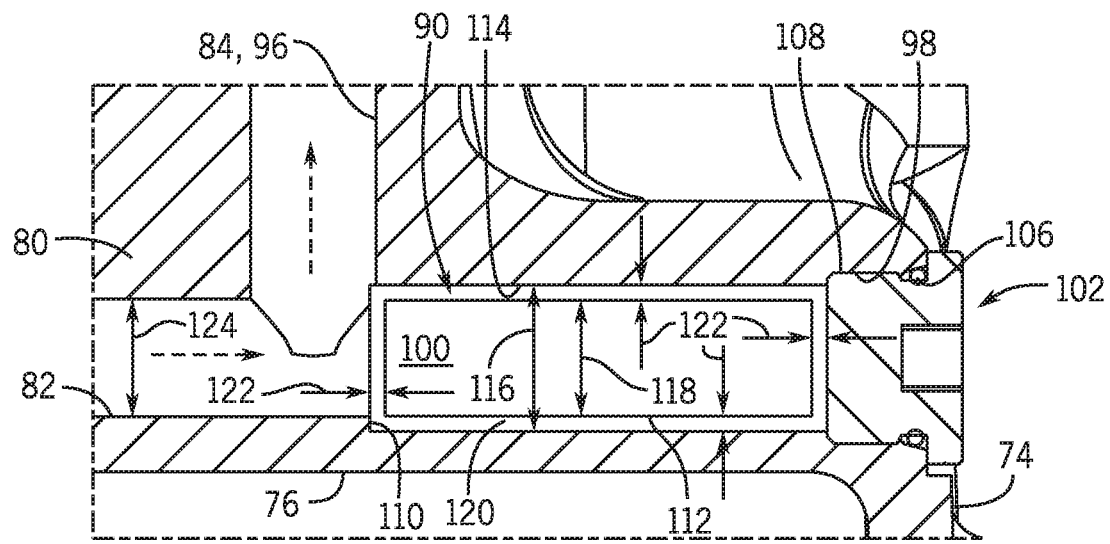
FIG. 4 is a partial cross-sectional view of area 4-4 of FIG. 3 with a first example filler insert.

Referring also to FIG. 4 illustrating a first example, a filler insert 100 is installed within the access passage 90 along with a plug 102 mounted at the access opening 98 and projecting into the access passage 90. The plug 102 closes the access opening 98 to prevent hydraulic fluid from exiting the second housing body 54 and contaminants and debris from entering the hydraulic circuit. The plug 102 may include or be coupled with a gasket 106 to improve sealing. To this end, the plug 102 includes an annular wall 108 with a tight fit in the access opening 98, for example by threading or press fit. In this example, the plug 102 and the filler insert 100 are separate parts and the access passage 90 provides, at least in part, a shoulder 110, defined by a radially inwardly extending wall, to contain the inner end of filler insert 100. Accordingly, during use, pressurized hydraulic fluid in the access passage 90 completely surrounds the filler insert 100 on all sides (i.e., its annular circumference and circular axial ends), including between the filler insert 100 and the plug 102. The shoulder 110 may be formed by additional counterbore drilling operation after the hydraulic circuit 40 is drilled from the second housing body 54.

The filler insert 100 defines a shank 112 with a complementary shape to an inner wall surface 114 of the access passage 90, for example both the shank 112 and the access passage 90 may be generally cylindrical and at least in part have a circular cross-section. The inner wall surface 114 defines a first diameter 116 and the shank 112 defines a second diameter 118 that is less than the first diameter 116, creating an annular space 120 between the shank 112 and the inner wall surface 114 that allows hydraulic fluid to encircle and envelope the shank 112 of the filler insert 100 and create a gap 122 between the shank 112 and the inner wall surface 114, the plug 102, and the shoulder 110. The shoulder 110 results in the first diameter 116 of the access passage being greater than a third diameter 124 of the hydraulic fluid passage 82, and the second diameter 118 of the shank 112 is also greater than the third diameter 124 to book-end and contain the filler insert 100 within the access passage 90. In certain cases, such as in the illustrated example, the filler insert 100 (here the shank 112) may occupy from about 85% to about 99% of the volume of the access passage 90, which may be determined based on the overall volume of the access passage 90 or based on the cross-sectional area (i.e., the radial dimension of the second diameter 118 may be about 85% to about 99% of the first diameter 116). In either case, at the upper end of this range, the hydraulic fluid encircling the shank 112 is effectively a thin coating of hydraulic fluid around the shank 112. The filler insert 100 may be formed from a rigid material, such as steel or other metal. The filler insert 100 thus occupies most, indeed nearly all of the volume within the access passage 90, with only a small volume of hydraulic fluid, in some cases a thin coating of hydraulic fluid, enveloping the filler insert 100. This results in a low-cost, readily manufactured/assembled, mechanism for reducing air within the hydraulic circuit and alleviating the associated adverse impact on the consistency and responsiveness of the hydraulic circuit and the hydraulic device (e.g., the transmission 38).

Figure 5:
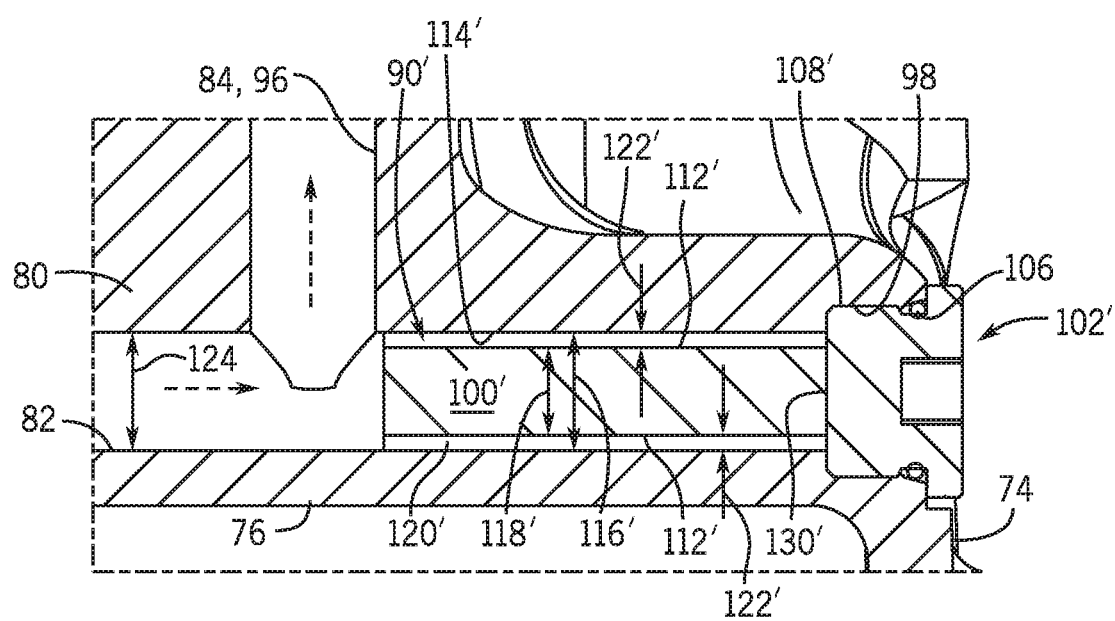
FIG. 5 is a similar partial cross-sectional view albeit with a second example filler insert.

Referring now to FIG. 5, a second example filler insert 100' and plug 102' provide similar benefits to the arrangement of FIG. 4. In this example, the filler insert 100' includes a plug 102' formed integrally as one unitary part (e.g., formed from the same material by the same process at the same time). Similar to the example of FIG. 4, pressurized hydraulic fluid in the access passage 90' completely surrounds the filler insert 100' except in this instance a proximal longitudinal end 130' of the filler insert 100' is not surrounded because it is formed unitary with the plug 102'. In particular, the plug 102' closes the access opening 98 to prevent hydraulic fluid from exiting the second housing body 54 and may include the gasket 106 to improve sealing. To this end, the plug 102' includes an annular wall 108' with a tight fit in the access opening 98, for example by threading or press fit.

The filler insert 100' defines a shank portion 112' with a complementary shape to an inner wall surface 114' of the access passage 90', for example both the shank portion 112' and the access passage 90' may be generally cylindrical and at least in part have a circular cross-section. The inner wall surface 114' defines a first diameter 116' and the shank portion 112' has a second diameter 118' that is less than the first diameter 116', creating an annular space 120' between the shank portion 112' and the inner wall surface 114 that allows hydraulic fluid to encircle the shank portion 112' of the filler insert 100' and to create a gap 122' between the shank 112 and the inner wall surface 114'. In this example, the shoulder 110 of FIG. 4 is omitted, and the first diameter 116' of the access passage is substantially equal to the third diameter 124 of the hydraulic fluid passage 82, and the second diameter 118' of the shank portion 112' is less than the third diameter 124. The plug 102' retains the filler insert 100' within the access passage 90'. The shank portion 112' may occupy from about 85% to about 99% of the volume of the access passage 90', which may be determined based on the overall volume of the access passage 90' or based on the cross-sectional area (i.e., the radial dimension of the second diameter 118' may be about 85% to about 99% of the first diameter 116'). In either case, at the upper end of this range, the hydraulic fluid encircling the shank portion 112' may be thin coating of hydraulic fluid around the shank portion 112'. As with the preceding example, the filler insert 100' may be formed from a rigid material, such as steel or other metal. The filler insert 100' thus occupies most or nearly all of the volume within the access passage 90, with only a small volume of hydraulic fluid, in some cases a thin coating of hydraulic fluid, enveloping the filler insert 100'. This results in a low-cost, readily manufactured/assembled, mechanism for reducing air within the hydraulic circuit and alleviating the associated adverse impact on the consistency and responsiveness of the hydraulic circuit and the hydraulic device (e.g., the transmission 38).

Within the transmission 38, the hydraulic circuit 40 conveys pressurized hydraulic fluid from a portion of the hydraulic system 28 to the control valve 42 via the internal passages 82, 84, 86, 88. Due to the filler insert 100, 100', the access passage 90, 90' contains a relatively small volume of hydraulic fluid in the annular space 120, 120' that does not materially contribute to the flow to the control valve 42. The filler insert 100, 100' does not completely block the access passage 90, 90' from a potential flow of hydraulic fluid, but instead minimizes the available volume in the access passage 90, 90'. At the same time, the plug 102, 102' ensures that the hydraulic circuit 40 remains enclosed.

Embodiments of the hydraulic circuit with a filler insert may include additional manifestations of the disclosed features or rearrangements thereof. Although the disclosed filler insert and internal passages are substantially cylindrical, various other shapes are contemplated including those with cross-sections that taper and/or are non-circular. Accordingly, the disclosed volumetric insert may be of any shape to loosely fit with the intended internal passage(s). The volumetric insert is applicable to a variety of uses, particularly a variety of hydraulic circuits, where it may be desirable to reduce an excess volume of fluid in an unused or vestigial passage in the same manner as the access passage of the present disclosure.

Enumerated Examples of Hydraulic Device with Decoupled Filler Insert for Hydraulic Circuit Volume Reduction Also, the following examples are provided, which are numbered for ease of reference.

1. A hydraulic device for a work vehicle, the hydraulic device including: a device body having a first surface, a second surface and wall structure between the first surface and the second surface, the wall structure defining a plurality of internal passages including an access passage and a hydraulic fluid passage, the access passage at least in part having a cylindrical inner wall surface of a first diameter, the access passage extending through the wall structure from an access opening in the device body to the hydraulic fluid passage, the hydraulic fluid passage extending through the wall structure from an entry opening in the first surface of the device body to an exit opening in the second surface of the device body to deliver hydraulic fluid through the wall structure from the entry opening to the exit opening; a plug fixedly or removably mounted to the device body to close the access opening; and a filler insert disposed proximate or coupled to the plug within the access passage, the filler insert having a cylindrical shank at least in part having a circular cross-section of a second diameter that is less than the first diameter of the inner wall surface of the access passage so as to be decoupled from the inner wall surface of the access passage; wherein an annular space between the shank of the filler insert and the inner wall surface of the access passage allows the hydraulic fluid to encircle at least a part of the shank of the filler insert.

2. The hydraulic device of example 1, wherein the plug and the filler insert are separate parts.

3. The hydraulic device of example 2, wherein the hydraulic fluid completely surrounds the filler insert.

4. The hydraulic device of example 1, wherein the plug and the filler insert are formed as a unitary part.

5. The hydraulic device of example 1, wherein the access passage defines a shoulder proximate an end of the filler insert opposite the plug having a radially extending wall between the access passage and the hydraulic fluid passage to retain the filler insert within the access passage.

6. The hydraulic device of example 1, wherein the plug and the filler insert occupy from about 85% to about 99% of a volume of the access passage.

7. The hydraulic device of example 1, wherein the access passage extends from the hydraulic fluid passage to an exterior of the device body without connecting to another component of the work vehicle; and wherein the hydraulic fluid passage communicates hydraulic fluid from a hydraulic supply of the work vehicle to the hydraulic device.

8. A hydraulic transmission for a work vehicle, the hydraulic transmission including: a plurality of gears providing multiple gear ratios; a clutch for shifting the plurality of gears among the multiple gear ratios, the clutch powered at least in part by hydraulic pressure; a gearbox body mounting the plurality of gears and the clutch within an internal cavity, the gearbox body having a first surface, a second surface and wall structure between the first surface and the second surface, the wall structure defining a plurality of internal passages including an access passage and a hydraulic fluid passage, the access passage at least in part having a cylindrical inner wall surface of a first diameter, the access passage extending through the wall structure from an access opening in the gearbox body to the hydraulic fluid passage, the hydraulic fluid passage extending through the wall structure from an entry opening in the first surface of the gearbox body to an exit opening in the second surface of the gearbox body to deliver hydraulic fluid through the wall structure from the entry opening to the exit opening; one or more control valves in fluid communication with the hydraulic fluid passage and configured to activate the clutch; a plug fixedly or removably mounted to the gearbox body to close the access opening; and a filler insert disposed proximate or coupled to the plug within the access passage, the filler insert having a cylindrical shank at least in part having a circular cross-section of a second diameter that is less than the first diameter of the inner wall surface of the access passage so as to be decoupled from the inner wall surface of the access passage; wherein an annular space between the shank of the filler insert and the inner wall surface of the access passage allows the hydraulic fluid to encircle at least a part of the shank of the filler insert.

9. The hydraulic transmission of claim 8, wherein the gearbox body is defined by: a first body portion having the plurality of internal passages; and a second body portion mountable to the first body portion, the first and second body portions together defining the internal cavity.

10. The hydraulic transmission of example 8, wherein the access passage extends from the hydraulic fluid passage to an exterior of the gearbox body without connecting to a component of the hydraulic transmission; and wherein the hydraulic fluid passage communicates, at least in part, hydraulic fluid from a hydraulic supply of the work vehicle to the one or more control valves.

11. The hydraulic transmission of example 8, wherein the plug and the filler insert are separate parts.

12. The hydraulic transmission of example 11, wherein the hydraulic fluid completely surrounds the filler insert.

13. The hydraulic transmission of example 8, wherein the plug and the filler insert are formed as a unitary part.

14. The hydraulic transmission of example 13, wherein the access passage defines a shoulder proximate an end of the filler insert opposite the plug having a radially extending wall between the access passage and the hydraulic fluid passage to retain the filler insert within the access passage.

15. The hydraulic transmission of example 8, wherein the plug and the filler insert occupy from about 85% to about 99% of a volume of the access passage.

CONCLUSION

There has thus been described embodiments of a hydraulic device, such as a transmission, for a work vehicle, that includes a hydraulic circuit with a filler insert feature contained within, and uncoupled from, a superfluous internal passage (e.g., a manufacturing access passage). The filler insert reduces the unneeded internal volume of the hydraulic circuit, thereby reducing the volume and flow requirements for the hydraulic fluid. By reducing the internal volume and the hydraulic fluid volume within the hydraulic circuit, the filler insert also serves to reduce or eliminate air that is entrained within the hydraulic fluid or otherwise trapped within dead areas of the hydraulic circuit. In certain applications requiring high speed and precision, such volume, and the attendant air, reduction may improve consistency and performance of the hydraulic circuit and thereby enhance the operation of the hydraulic device by improving its response time and accuracy.

As used herein, the singular forms "a", "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A hydraulic device for a work vehicle, the hydraulic device comprising:
 a device body having a first surface, a second surface and wall structure between the first surface and the second surface, the wall structure defining a plurality of internal passages including an access passage and a hydraulic fluid passage, the access passage at least in part having a cylindrical inner wall surface of a first diameter, the access passage extending through the wall structure from an access opening in the device body to the hydraulic fluid passage, the hydraulic fluid passage extending through the wall structure from an entry opening in the first surface of the device body to an exit opening in the second surface of the device body to deliver hydraulic fluid through the wall structure from the entry opening to the exit opening, the hydraulic fluid passage defining a flow path of which the access passage is not a part;
a plug fixedly or removably mounted to the device body to close the access opening; and
a filler insert disposed proximate or coupled to the plug within the access passage, the filler insert having a cylindrical shank at least in part having a circular cross-section of a second diameter that is less than the first diameter of the inner wall surface of the access passage so as to be decoupled from the inner wall surface of the access passage, the second diameter being 85% to 99% of the first diameter;
wherein an annular space between the shank of the filler insert and the inner wall surface of the access passage allows the hydraulic fluid to encircle at least a part of the shank of the filler insert.

2. The hydraulic device of claim 1, wherein the plug and the filler insert are separate parts.

3. The hydraulic device of claim 2, wherein the hydraulic fluid completely surrounds the filler insert.

4. The hydraulic device of claim 1, wherein the plug and the filler insert are formed as a unitary part.

5. The hydraulic device of claim 1, wherein the access passage defines a shoulder proximate an end of the filler insert opposite the plug having a radially extending wall between the access passage and the hydraulic fluid passage to retain the filler insert within the access passage.

6. The hydraulic device of claim 1, wherein the plug and the filler insert occupy from about 85% to about 99% of a volume of the access passage.

7. The hydraulic device of claim 1, wherein the access passage extends from the hydraulic fluid passage to an exterior of the device body without connecting to another component of the work vehicle; and
wherein the hydraulic fluid passage communicates hydraulic fluid from a hydraulic supply of the work vehicle to the hydraulic device.

8. A hydraulic transmission for a work vehicle, the hydraulic transmission comprising:
a plurality of gears providing multiple gear ratios;
a clutch for shifting the plurality of gears among the multiple gear ratios, the clutch powered at least in part by hydraulic pressure;
a gearbox body mounting the plurality of gears and the clutch within an internal cavity, the gearbox body having a first surface, a second surface and wall structure between the first surface and the second surface, the wall structure defining a plurality of internal passages including an access passage and a hydraulic fluid passage, the access passage at least in part having a cylindrical inner wall surface of a first diameter, the access passage extending through the wall structure from an access opening in the gearbox body to the hydraulic fluid passage, the hydraulic fluid passage extending through the wall structure from an entry opening in the first surface of the gearbox body to an exit opening in the second surface of the gearbox body to deliver hydraulic fluid through the wall structure from the entry opening to the exit opening, the hydraulic fluid passage defining a flow path of which the access passage is not a part;
one or more control valves in fluid communication with the hydraulic fluid passage and configured to activate the clutch;
a plug fixedly or removably mounted to the gearbox body to close the access opening; and
a filler insert disposed proximate or coupled to the plug within the access passage, the filler insert having a cylindrical shank at least in part having a circular cross-section of a second diameter that is less than the first diameter of the inner wall surface of the access passage so as to be decoupled from the inner wall surface of the access passage, the second diameter being 85% to 99% of the first diameter;
wherein an annular space between the shank of the filler insert and the inner wall surface of the access passage allows the hydraulic fluid to encircle at least a part of the shank of the filler insert.

9. The hydraulic transmission of claim 8, wherein the gearbox body is defined by:
a first body portion having the plurality of internal passages; and
a second body portion mountable to the first body portion, the first and second body portions together defining the internal cavity.

10. The hydraulic transmission of claim 8, wherein the access passage extends from the hydraulic fluid passage to an exterior of the gearbox body without connecting to a component of the hydraulic transmission; and
wherein the hydraulic fluid passage communicates, at least in part, hydraulic fluid from a hydraulic supply of the work vehicle to the one or more control valves.

11. The hydraulic transmission of claim 8, wherein the plug and the filler insert are separate parts.

12. The hydraulic transmission of claim 11, wherein the hydraulic fluid completely surrounds the filler insert.

13. The hydraulic transmission of claim 8, wherein the plug and the filler insert are formed as a unitary part.

14. The hydraulic transmission of claim 13, wherein the access passage defines a shoulder proximate an end of the filler insert opposite the plug having a radially extending wall between the access passage and the hydraulic fluid passage to retain the filler insert within the access passage.

15. The hydraulic transmission of claim 8, wherein the plug and the filler insert occupy from about 85% to about 99% of a volume of the access passage.

16. A work vehicle comprising:
a hydraulic transmission including:
a plurality of gears providing multiple gear ratios;
a clutch for shifting the plurality of gears among the multiple gear ratios, the clutch powered at least in part by hydraulic pressure;
a gearbox body mounting the plurality of gears and the clutch within an internal cavity, the gearbox body having a first surface, a second surface and wall structure between the first surface and the second surface, the wall structure defining a plurality of internal passages including an access passage and a hydraulic fluid passage, the access passage at least in part having a cylindrical inner wall surface of a first diameter, the access passage extending through the wall structure from an access opening in the gearbox body to the hydraulic fluid passage, the hydraulic fluid passage extending through the wall structure from an entry opening in the first surface of the gearbox body to an exit opening in the second surface of the gearbox body to deliver hydraulic fluid through the wall structure from the entry opening to the exit opening, the hydraulic fluid passage defining a flow path and the access passage being a non-operative passage separate from the flow path;

one or more control valves in fluid communication with the hydraulic fluid passage and configured to activate the clutch;

a plug fixedly or removably mounted to the gearbox body to close the access opening; and a filler insert disposed proximate or coupled to the plug within the access passage, the filler insert having a cylindrical shank at least in part having a circular cross-section of a second diameter that is less than the first diameter of the inner wall surface of the access passage so as to be decoupled from the inner wall surface of the access passage, the second diameter being 85% to 99% of the first diameter;

wherein an annular space between the shank of the filler insert and the inner wall surface of the access passage allows the hydraulic fluid to encircle at least a part of the shank of the filler insert.

17. The work vehicle of claim 16, wherein the plug and the filler insert are separate parts; and wherein the hydraulic fluid completely surrounds the filler insert.

18. The work vehicle of claim 16, wherein the plug and the filler insert are formed as a unitary part.

19. The work vehicle of claim 16, wherein the access passage defines a shoulder proximate an end of the filler insert opposite the plug having a radially extending wall between the access passage and the hydraulic fluid passage to retain the filler insert within the access passage.

20. The work vehicle of claim 16, wherein the plug and the filler insert occupy from about 85% to about 99% of a volume of the access passage.

* * * * *